UNITED STATES PATENT OFFICE.

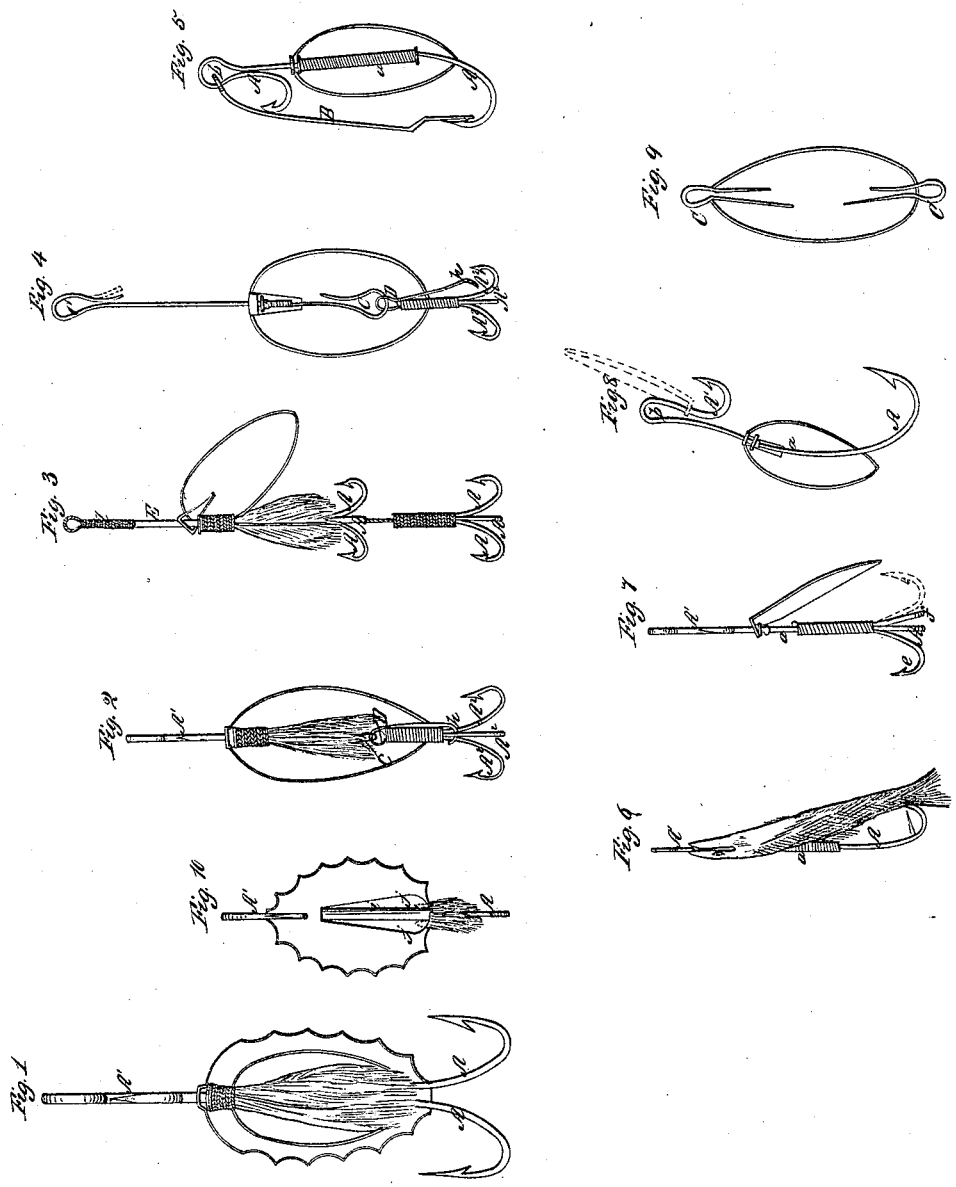

JULIO T. BUEL, OF WHITEHALL, NEW YORK.

IMPROVED FISHING-TACKLE.

Specification forming part of Letters Patent No. 14,706, dated April 22, 1856.

*To all whom it may concern:*

Be it known that I, JULIO T. BUEL, of Whitehall, in the county of Washington and State of New York, have invented certain new and useful Improvements in Fishing-Tackle; and I do hereby declare that the following is a full, clear, and exact description of the same, reference being had to the accompanying drawings, forming part of this specification, in which—

Figure 1 is an elevation of a large trolling-hook made after my invention. Fig. 2 is an elevation of a small trolling-hook secured to the shank after my invention. Fig. 3 is an elevation of a double minnow gang of hooks, showing a method of protecting the line from wear at the point where the artificial bait spins on it. Fig. 4 is an elevation of a single minnow gang of hooks, showing a new construction of eye for connecting the hooks to the shank. Fig. 5 is a side view of my hook, showing it admits of a spring protection being applied to it. Fig. 6 is a view of a hook made after my invention in two parts. In this view a natural minnow is secured on the hook and twisted spirally. Fig. 7 is a view of a minnow gang of hooks with my improvement, showing one of the gang made so as to turn free of the others. Fig. 8 is similar to Fig. 7, made in one piece. Fig. 9 is an elevation of an artificial bait with the improved eye shown in Fig. 4 applied to it. Fig. 10 is an elevation of an artificial bait, showing a new method of confining the feathers to it.

The same letters refer to like parts in each of the figures.

The nature of my invention consists, first, in having the upper part of the shank of the hook, which is made solid or in two parts, terminate in a small barb, whereby a minnow can be secured upon the hook more permanently, and in a position to insure the capture of the fish so surely as he bites at it.

It consists, secondly, in having the hook thus constructed made in two parts, so as to allow of the lower barb being turned out of line with the upper one, and so constructing the upper barb that an elastic eye shall be formed by it and the shank, whereby the artificial minnow may be conveniently placed on or removed from the shank and a natural minnow substituted for it and twisted spirally, and thus caused to spin similar to an artificial bait when in the water.

It consists, thirdly, in combining with the lower barb of the improved hook one or more minnow barbs in a manner to form a minnow gang, and having one of the minnow barbs turn free of the lower barb of the improved hook, so that when desirable a spiral twist may be given to the natural minnow.

A A', Figs. 5, 6, and 8, represent the improved hook, A designating the lower barb and A' the upper barb. The shank *a* in Fig. 8 is made in one piece, and the upper barb is bent round in line with the lower barb, and forms an eye, *b*, which serves for receiving a hook on the line and confining it, owing to being closed by the upper barb, which is elastic and yields when it is desired to open the eye.

By making the hook with two barbs, as shown, a natural minnow can be fastened, both by its head and tail, in a position to prevent a fish getting it off and to insure its capture when it bites at the minnow, as will be seen in Fig. 6. An eye, *b*, is also formed, which can be opened and closed readily when it is desired to substitute an artificial for a natural minnow, or vice versa. A standard is likewise always provided, and I can use my patented spring-protection B, Fig. 5, whenever necessary.

Having the upper barb form an elastic eye also enables me to please sportsmen, who differ in opinion as regards the best bait to use, by furnishing them with a tackle which may be used either with an artificial or natural bait, said elastic eye admitting of the ready detachment or attachment of the artificial bait.

By examining Figs. 5 and 6 it will be seen that the shank *a* of the hook is made in two parts, and said parts are united loosely together by wiring. It is by thus making the hook that the lower barb can be moved out of line with the upper one and the natural minnow, if on the two barbs, A A', twisted spirally, as illustrated in Fig. 6, so as to spin as it moves in the water.

In Fig. 7 a modification of Fig. 6 is shown, wherein two hooks, *e f*, are placed on the side of the barb A. One of said hooks is capable of turning loosely, as illustrated by dotted lines, and when the minnow is secured upon it and the upper one, twist it in a similar manner, as illustrated in Fig. 6, and thus cause it to spin when moving in the water.

What I claim as my invention, and desire to secure by Letters Patent, is—

1. A hook with two barbs, A A', substantially as and for the purpose set forth.

2. Making the hook having two barbs, A A', in two parts, and uniting said parts loosely together, so that one shall turn free of the other, substantially as and for the purpose set forth.

3. Combining with the barb A one or more minnow-barbs and having one of the barbs turn free of the barb A, substantially as and for the purpose set forth.

JULIO T. BUEL.

Witnesses:
   DENNIS JONES,
   E. W. PARKER.